US008892777B2

(12) United States Patent
Steindl

(10) Patent No.: US 8,892,777 B2
(45) Date of Patent: Nov. 18, 2014

(54) METHOD FOR ADDRESS TRANSMISSION

(75) Inventor: Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 198 days.

(21) Appl. No.: 13/523,021

(22) Filed: Jun. 14, 2012

(65) Prior Publication Data

US 2012/0324126 A1 Dec. 20, 2012

(30) Foreign Application Priority Data

Jun. 15, 2011 (EP) ..................................... 11169995

(51) Int. Cl.
*G06F 15/16* (2006.01)
*H04L 29/12* (2006.01)
*H04L 12/64* (2006.01)

(52) U.S. Cl.
CPC ...... *H04L 29/12028* (2013.01); *H04L 12/6418* (2013.01); *H04L 61/103* (2013.01)
USPC ............................ 709/245; 709/238; 709/230

(58) Field of Classification Search
CPC .................. H04L 29/12933; H04L 29/12028; H04L 12/6418; H04L 61/103
USPC .................... 709/245, 238, 230, 249
See application file for complete search history.

(56) References Cited

U.S. PATENT DOCUMENTS

| | | | | |
|---|---|---|---|---|
| 2004/0221042 A1* | 11/2004 | Meier | ........................... | 709/245 |
| 2005/0136924 A1* | 6/2005 | Adrangi et al. | ............... | 370/338 |
| 2005/0243739 A1* | 11/2005 | Anderson et al. | ............. | 370/254 |
| 2007/0081494 A1* | 4/2007 | Petrescu et al. | ............... | 370/331 |
| 2010/0097994 A1* | 4/2010 | Papadimitriou | .............. | 370/328 |

OTHER PUBLICATIONS

Perlman R Ed-Ross K et al: "Rbridges: transparent routing", INFOCOM 2004. Twenty-Third Annual Joint Conference of the IEEE Computer and Communications Societies, IEEE, Piscataway, NJ, USA, Band 2, 7. März 2004 (Mar. 7, 2004), Seiten 1211-1218), XP010742850, DOI: 10.1109/INFCOM.2004.1357007, ISBN: 978-0-7803-8355-5, Passage IV.B "Handling ARP's", Others; 2004; US.
"DCP Master Slave Configuration to Sccale the DCP beyond an IP Subnet", IP.Com Journal, IP.Com Inc., West Henrietta, NY, US, 25. Juli 2010, XP013139055, ISSN: 1533-0001, Das Ganze Dokument; Others; 2010; US.
Wimer Carnegie Mellon University W: "Clarifications and Extensions for the Bootstrap Protocol; rfc1542.txt", 5. JCGT-VC Meeting; 96. MPEG Meeting; Mar. 16, 2011-Mar. 23, 2011; Geneva; (Coint Collaborative Team on Viedeo Coding of ISO/IEC JTC1/SC)/WG11AND ITU-T SG.16); WFTP3.ITU.INT/AV-ARCH/JC TVC-Site/, Internet Engineering Task Force, CH, 1. Oktober 1993 (Oct. 1, 1993), XP015007329, ISSN: 0000-0003, Kapitel 4 incl. Unterkapitel; Others; 2011; CH.

* cited by examiner

*Primary Examiner* — Philip B Tran
(74) *Attorney, Agent, or Firm* — Cozen O'Connor

(57) ABSTRACT

A method for transmission of an address of a first network device from the first network device through a network node to a second network device, wherein the method comprises receiving a first request signal by the network node from the second network device, creating a second request signal by the network node, sending a second response signal to the first network device, receiving a first response signal as a response to the second request signal by the network node, and sending a second response signal to the second network device as a response to the first request signal.

6 Claims, 4 Drawing Sheets

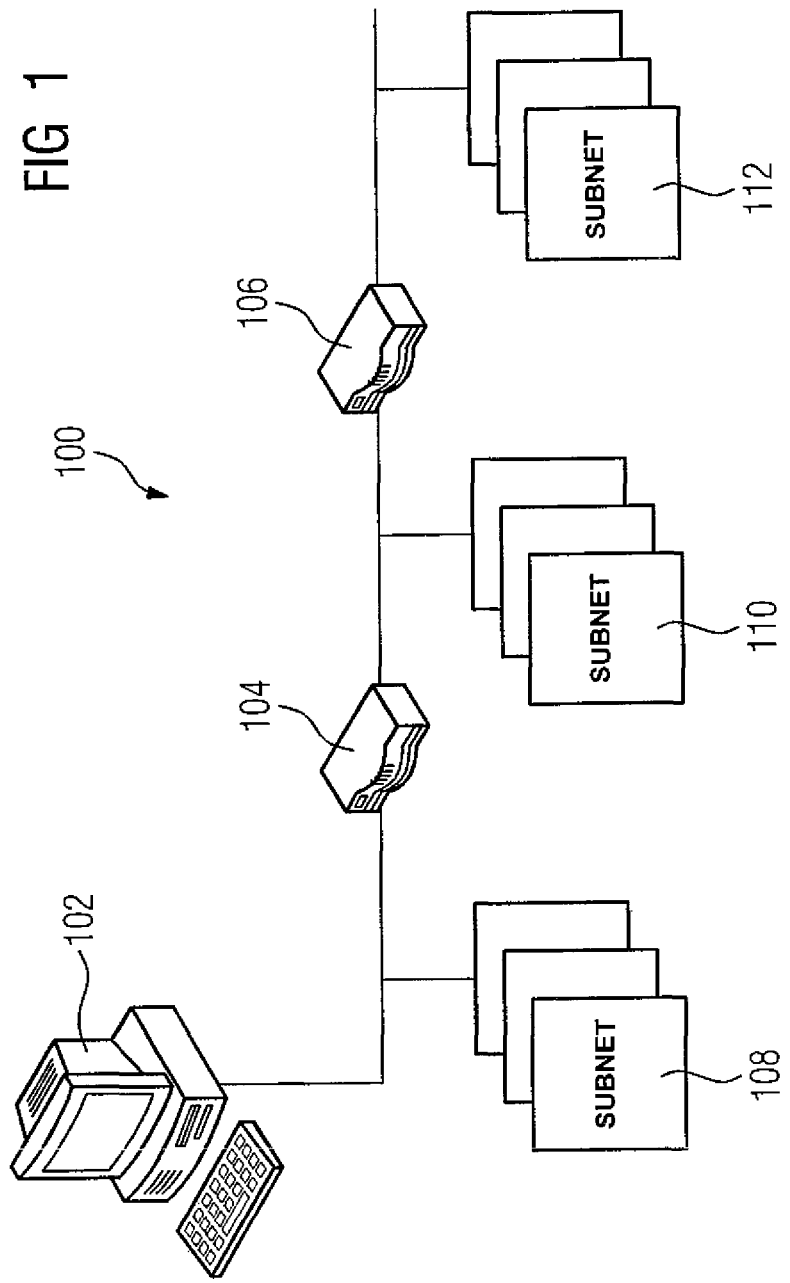

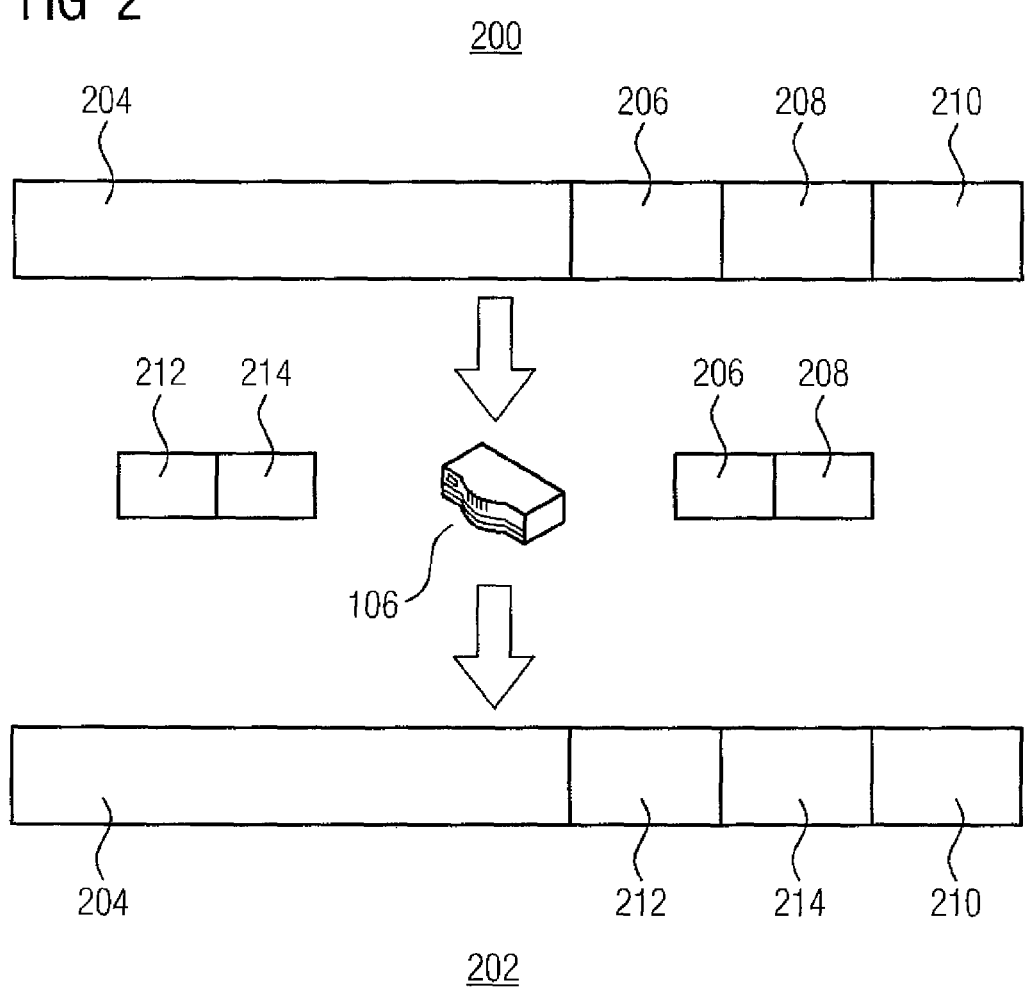

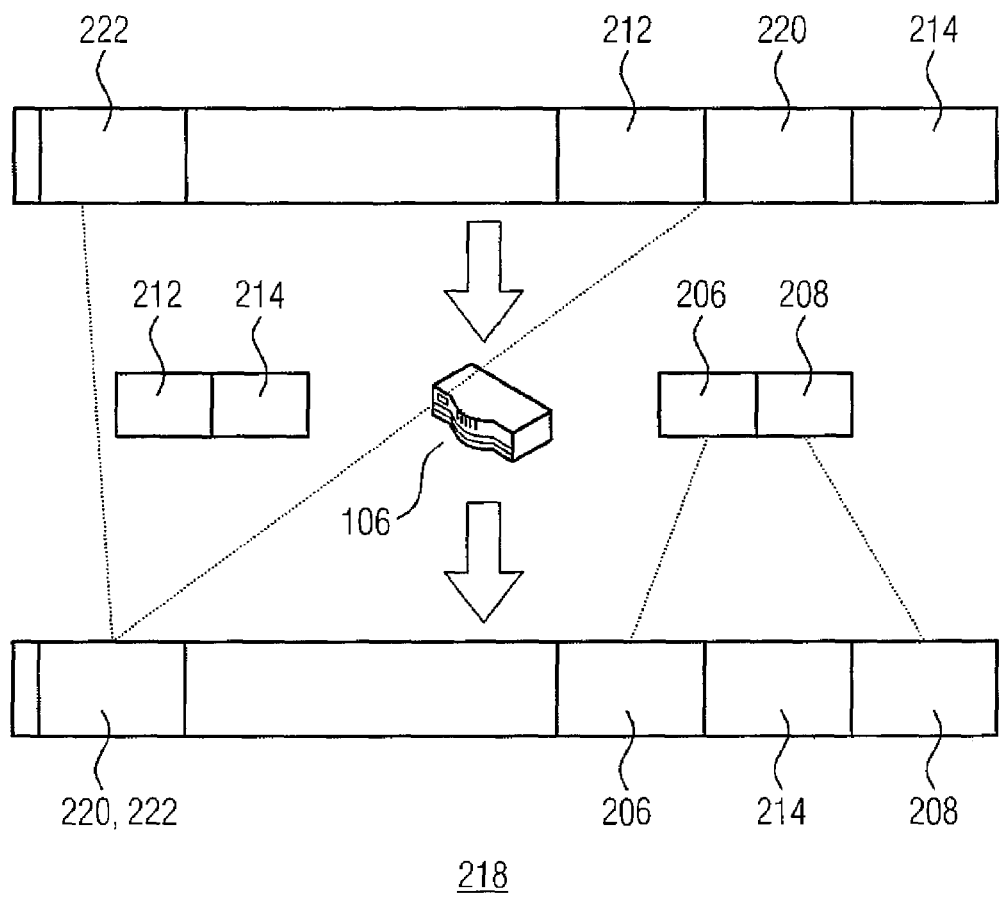

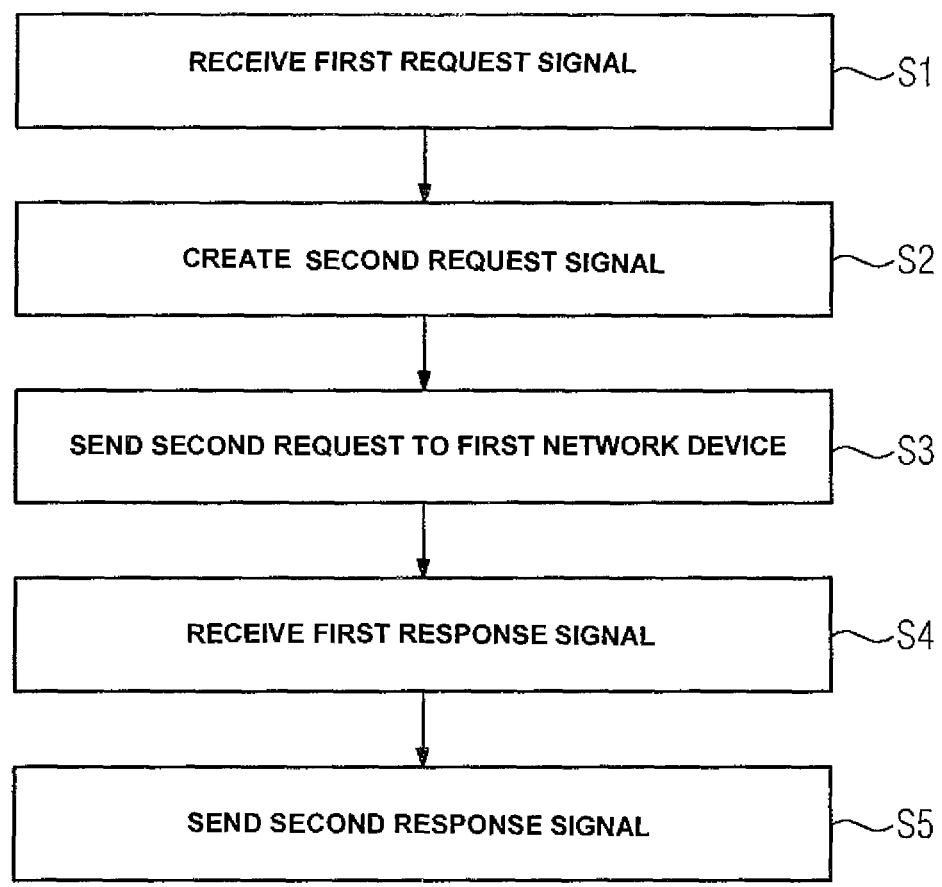

METHOD FOR ADDRESS TRANSMISSION

BACKGROUND OF THE INVENTION

1. Field of the Invention

The invention relates to a method for transmitting the address of a network device in a network and, more particularly, to a method for transferring an address of a first network device from the first network device through a network node to a second network device.

2. Description of the Related Art

The Open Systems Interconnection (OSI) layer model relates to communication in a network. There are protocols which use what is referred to as the data link layer, layer 2, to exchange addresses of the network devices between devices, so that each network device has information about addresses of other network devices of the same network. These addresses can be used for communication in the network.

In "Rbridges: Transparent Routing" (Infocom 2004. 23$^{rd}$ Annual Joint Conference of the IEEE Computer and Computer and Communications Societies), Radia Perlman describes an infrastructure of switches in which Address Resolution Protocol (ARP) messages are used to transfer addresses.

In "DCP Master Slave Configuration to Scale the DCP beyond an IP Subnet" (ip.com Journal, ISSN: 1533-0001), Shanbhag et al. describe network management software which manages network devices using the "Discovery and Basic Configuration Protocol" (DCP).

In "Clarifications and Extensions for the Bootstrap Protocol" (5th JCT-VC Meeting; 96. MPEG Meeting; Joint Collaborative Team on Video Coding of ISO/IEC JTC1/SC29/WG11AND ITU-T Sg. 16), Wimer describes a tracking protocol for the Internet-Standard.

SUMMARY OF THE INVENTION

Within the foregoing context, it is an object of the invention to provide an improved method for transferring an address, an improved network node and an improved computer program product.

These and other objects and advantages are achieved in accordance with the invention by a method for transferring an address of a first network device from a first network device through a network node to a second network device in which a first request signal is initially received by the network node from the second network device. The first request signal comprises a first request identifier and a request for the address of the first network device. A second request signal is then generated by the network node. The second request signal comprises the request and a second request identifier. The second request signal is sent to the first network device by the network node.

Triggered by the sending of the second request signal, a first response signal is received as a response to the second request signal by the network node after a time delay, which depends on the network parameters. The first response signal comprises the address of the first network device and the second request identifier. Through the receipt of the first response signal, the sending of a second response signal to the second network device is triggered as a response to the first request signal. The second response signal comprises the address of the first network device and the first request identifier.

The first network device is thus not directly connected to the second network device. The first network device is connected through the network node to the second network device. For example, what is referred to as a life list is to be maintained by the second network device. This is a list, for example, comprising the addresses of the network devices of the network. Such a list can be used, for example, to send messages in the network from a network device to another network device. These can also be what are known as multicast or broadcast messages. In these cases a message is sent to a number of network devices or all network devices of the network. For this purpose, it is necessary for the addresses of the network devices to which a message is to be sent to be known.

If, for example, a protocol of the second layer of the OSI layer model is now used for the transfer of the address from the first network device to be second network device, a method in accordance with embodiments of the invention is advantageous because it makes it possible to transmit the address through a network node. For the transmission of the address in accordance with a method from the prior art, it would be impossible for the second network device, with a protocol of the second layer of the OSI layer model, to detect the address of the first network device if the network node is located between the second network device and the first network device. The second network device would merely receive the address of the network node. If the address of the first network device is also to be accepted into the life list maintained by the second network device, the second network device would have to be inserted into the subnet of the first network device. Here, a subnet is to be understood as a part of a network that is separated from other parts of the network by a network node. Here, a network node can, for example, be understood as a router or a switch.

It is thus possible in accordance with disclosed embodiments of the invention, with a request for a network address in accordance with the protocol of the second layer of the OSI layer model, to receive the network address of the first network device, even if the first network device is located in a different subnet from the second network device.

Advantageously, the network node stores the first request identifier, so that on receipt of the first response signal a connection is made between the received address of the first network device and the stored first request identifier. In other words, a connection can be made between the first response signal and the first request signal, so that the network node is in a position to send the second response signal as a response to the first request signal.

In accordance with an embodiment of the invention, the first request signal comprises an address of the second network device. The network node stores the address of the second network device and the first request identifier. As soon as the second request identifier has been generated, the network node stores this second request identifier, the address of the second network device and the first request identifier linked to each other. As a result, it becomes possible for the network node, after receipt of the first response signal with the address of the first network device, to make a connection between the address of the first network device and the second response identifier, by which a connection is also made between the address of the first network device and the first response identifier. The storage of the address of the second network device serves to make the destination address of the response signal known to the network node when the second response signal is sent. The second response signal is thus sent with the address of the second network device as the destination address.

In accordance with other embodiments of the invention the second request signal is sent through a further network node to the first network device. The first response signal is received by a further network node. In other words, there is yet another network node between the network node and the first network device. This is advantageous if the network comprises more than one subnet. Thus the addresses of all active network devices can be stored in the life list of the second network device and are thus known to the second network device.

In accordance with embodiments of the invention, the first request signal, the second request signal, the first response signal and the second response signal are signals of a protocol in accordance with the second layer of the OSI model. This is especially advantageous because in a communication by means of the protocol of the second layer of the OSI model a communication between network devices is made possible without what are referred to as the IP addresses of the network devices being needed for this communication. Thus network devices which do not have an IP address can also be used for communication.

In accordance with additional embodiments of the invention, an address database is stored in the second network device. The address of the first network device is added to the address database if the address of the first network device is received by the second network device from the network node. Such an address database can also be referred to as a life list, for example. Such an address database is useful if messages are to be sent to specific network devices. These can, for example, be what are referred to as unicast messages, multicast messages or broadcast messages. In addition, all active network devices are always known to the second network device if this method is used. This can be useful, for example, for project planning of the network using an engineering tool.

In accordance with other embodiments of the invention, the second request signal is output by a number of ports of the network node. Connected to the ports of the network node are further network devices and/or network nodes. In other words the second request signal is output as a multicast or preferably as a broadcast message. This is advantageous because in this way all network devices connected to the network node can be reached and notify their address to the network node as a response. In this way, the network node receives the addresses of all network devices connected to it and can output these as a response to the first response signal to the second network device. This is advantageous because in this way all addresses of the network devices connected to the network node will be notified to the second network node.

It is also an object of the invention to provide a network node for a network with a device for receiving a first request signal. Here, the first request signal comprises a first request identifier and a request as to the address of a first network device. In addition, the network node includes another device for generating a second request signal. Here, the second request signal comprises the request and a second request identifier. The network node further includes a sender device for sending the second request signal. These devices can include network connections, for example.

In addition, the network node includes a receiver device for receiving a first response signal as a response to the second request signal. Here, the first response signal comprises the address of the first network device and the second response identifier. These devices for receiving can, for example, also be the network connections. Furthermore, the network node comprises a sender device for sending a second response signal as a response to the first request signal. The second response signal includes the address of the first network device and the first request identifier.

It is also an object of the invention to provide a computer program product with instructions, where the instructions, when executed by a network node, cause the network node to perform the method in accordance with the disclosed embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the invention are explained in greater detail below with reference to the figures, in which:

FIG. 1 shows a schematic block diagram of a network with a number of subnets and network nodes in accordance with the invention;

FIG. 2 shows a schematic block diagram of a first request signal and a second request signal in accordance with the invention;

FIG. 3 shows a schematic block diagram of a first response signal and a second response signal in accordance with the invention; and FIG. 4 shows a flowchart of a method in accordance with an embodiment of the invention.

DETAILED DESCRIPTION OF THE PREFERRED EMBODIMENTS

Elements of the figures below are identified by the same reference characters if said elements have an identical function.

FIG. 1 is a schematic block diagram of a network 100 with three subnets 108, 110 and 112. The subnets 108, 110 and 112 each comprise at least one network device. The subnets 108, 110 and 112 can also include a number of network devices. The subnets 108, 110 and 112 are separated from one another by the network nodes 104 and 106. The network nodes 104 and 106 serve to forward signals from one of the subnets 108, 110 and 112 into another of the subnets 108, 110 and 112. For example, the network node 104 forwards messages and signals from the subnet 108 into the subnet 110 and/or to the network node 106, which for its part is responsible for forwarding signals and/or messages from the subnet 110 to the subnet 112 and from the subnet 112 to the subnet 110.

The network nodes 104 and 106 can be routers, gateways or switches, for example. It is also possible for the network nodes 104 and 106 to be more complex computers with their own processor.

In accordance with embodiments of the invention, a method is created with which it is possible to transmit an address of a first network device through at least one of the network nodes 104 or 106 to the second network device 102. In accordance with embodiments of the invention, this can also be achieved by the protocol of the second layer of the OSI layer model. The first network device can, for example, be located in the subnet 110 or in the subnet 112.

For example, the second network device 102 sends a first request signal to the network devices of subnet 108 and to network node 104. The first request signal includes a request for the addresses of the network devices that received this request signal. The first request signal serves to set up or to update an address database, for example, as a "life list" in the second network device 102. With the aid of the first request signal, all addresses of the network devices of the network 100 are to be transmitted to the second network device 102 as a reply to the first request signal.

All network devices of subnet 108 that have received the first request signal send a response signal to the second network device 102. Thus, all addresses of the network devices of subnet 108 have been notified to the second network device.

So that the addresses of the network devices of subnet 110 can also be notified to the second network device 102, network node 104, after receiving the first request signal, sends the second request signal to the network devices of subnet 110 and to network node 106. Network node 104 stores a request identifier of the first request signal and the address of the second network device, after responding to the second request signal, in order to be able to respond to the first request signal. The second request signal likewise comprises a request identifier that can be different from the request identifier of the first request signal.

All network devices of subnet 110 that have received the second request signal from network node 104 send a response signal to network node 104, which includes their address. In addition the response signal of the network devices of subnet 110 includes the request identifier of the second request signal. Network node 104, by comparing the request identifiers, initially links the received addresses of the network devices of subnet 110 with the second request signal. The second request identifier is stored linked to the first request identifier and the address of the network device in network node 104. As a result, network node 104 can output a response signal to the first request signal to the second network device which at least includes an address of the network devices of subnet 110. For example, for each address of a network device of subnet 110 a response signal to the first request signal is sent to the second network device 102.

The second request signal is also sent by network node 104 to network node 106. Network node 106 is programmed in a similar manner to network node 104. On receipt of the second request signal from network node 104, network node 106 creates a third request signal and outputs the signal to the network devices of subnet 112. When network node 106 response to the second request signal with a response signal including at least one address of the network devices of subnet 112, network node 104 forwards this address to the second network device 102 as a response to the first request signal.

FIG. 2 is a schematic block diagram of a first request signal 200 and of a second request signal 202. The first request signal 200 can be divided up into four sections. The request for the address of the network device that receives the first request signal 200 is stored in a first signal section. For example, the first request signal 200 can be a signal of what is referred to as the DCP protocol (Discovery and Basic Configuration Protocol). The DCP protocol is a protocol at the level of the second layer of the OSI layer model.

In a second signal section, the first request signal includes a first request identifier 206. In a third section, the first request signal 200 includes the address 208 of the second network device 102 from FIG. 1.

In a fourth section, the first request signal 200 includes the address 210 of the network device to which the first request signal 200 is to be sent. For example, the address 210 is an address area including all addresses of the network, so that the first request signal 200 is sent to all network devices of the network. The address 210 can also be an entry that the first request signal is to be sent as a broadcast message to all network devices of the network.

The first request signal is sent by the second network device 102 from FIG. 1 to network node 106. After receipt of the first request signal 200, network node 106 stores the first request identifier 206 and the address of the second network device 208. Preferably, the first request identifier 206 and the address of the second network device 208 are stored linked to each other.

Network node 106 creates a second request signal 202 which includes the request 204 for the address in a first section of the second request signal 202. In addition, the second request signal 202 includes in a second signal section a second request identifier 212 and in a third signal section the address 214 of network node 106. In a fourth signal section, the second request signal includes the address 210 which has been transferred from the first request signal 200, so that the second request signal 202 is preferably output to all network devices connected to network node 106.

Network node 106 stores the second request identifier 212 preferably linked to the first request identifier 206 and the address 208 of the second network device. In addition, network node 106 stores its address 214. The linked storage of the first request identifier 206 and the second request identifier 212 and the address 208 of the second network device makes it possible for network node 106, when responding to the second request signal 202, to be able to assign this response to the first request signal 200. This is now explained in greater detail in respect of FIG. 3.

FIG. 3 is a schematic block diagram of the first response signal 216 and of a second response signal 218. The first response signal 216 is received as a response to the second request signal by network node 106. In the event of the first response signal 216 being received directly by the first network device, the first response signal 216 includes the second request identifier 212, the address of network node 214 as destination address of the signal and as source address of the signal the address 220 of the first network device. Network node 106 can assign the first response signal 216 to the second request signal as a result of the second request identifier 212. The fact that the second request identifier 212 is stored linked to the first request identifier 206 into the address of the second network device 208 makes it possible for network node 106 to send the address 220 of the first network device in the second response signal 218 to the first network device. The second response signal 218 also includes as destination address of the signal the address 208 of the second network device and the first request identifier 206, so that the second response signal 218 can be assigned by the second network device to the first request signal. The second response signal 218 also includes as source address the address 214 of network node 106.

If the first response signal 216 is not received directly by the first network device, the first response signal 216 includes as source address 220 the address of the network node by which the first response signal 216 was received. In this case, the address 220 is thus not the address of the first network device but the address of a further network node, for example, network node 104 from FIG. 1. In this case, the first response signal 216, which, for example, was received by network node 104, also includes the address 222 of the first network device. In this case, it is not the address 220 of the further network node, but the address 222 of the first network device which is transmitted with the second response signal 218 to the first network device.

FIG. 4 is a flow diagram of a method in accordance with an embodiment of the invention. In step S1 a first request signal is received by the network node from the second network device. The first request signal includes a first request identifier and a request for the address of the first network device.

In step S2 a second request signal is subsequently created by the network node. The second request signal includes the request and a second request identifier. The second request signal is sent in step S3 to the first network device.

After the second request signal is sent, a first response signal is received in step S4 by the network node as a response to the second request signal. The first response signal includes the address of the first network device and the second request identifier. In step S5 a second response signal is then sent to the second network device as a response to the first request signal. The second response signal includes the address of the first network device and the first request identifier.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for transmitting an address of a first network device from the first network device through a network node to a second network device, the first network device and the second network device being located in different subnets, the method comprising:

receiving, by the network node, a first request signal from the second network device, the first request signal including a first request identifier and a request for the address of the first network device;

creating, by the network node, a second request signal, the second request signal including the request and a second request identifier;

sending, by the network node, the second request signal to the first network device;

receiving, by the network node, a first response signal as a response to the second request signal, the first response signal including the address of the first network device and the second request identifier; and sending, by the network node, a second response signal to the second network device as a response to the first request signal, the second response signal including the address of the first network device and the first request identifier;

wherein the first request signal, the second request signal, the first response signal and the second response signal are signals of the Discovery and Basic Configuration Protocol (DCP protocol) in accordance with a second layer of an Open Systems Interconnection (OSI) model.

2. The method as claimed in claim 1, wherein the first request signal includes an address of the second network device;

wherein the network node stores the address of the second network device and the first request identifier; and wherein the network node stores the address of the second network device, the first request identifier and the second request identifier linked to one another.

3. The method as claimed in claim 1, wherein the second request signal is sent through a further network node to the first network device, the first response signal being received by the further network node.

4. The method as claimed in claim 1, wherein an address database is stored in the second network device, and wherein the address of the first network device is received by the second network device from the network node.

5. The method as claimed in claim 1, wherein the second request signal is output by a plurality of ports of the network node, and wherein at least one of further network devices and network nodes are connected to the plurality of ports.

6. A network node for a network comprising:

a receiver device for receiving a first request signal including a first request identifier and a request for the address of a first network device;

a creator device for creating a second request signal including the request and a second request identifier;

a sender device for sending the second request signal;

the receiver device being configured to receive a first response signal in response to the second request signal, the first response signal including the address of the first network device and the second request identifier;

the sending device being configured to send a second response signal in respond to the first request signal, the second response signal including the address of the first network device and the first request identifier;

wherein the first network device and the second network device are located in different subnets, and wherein the first request signal, the second request signal, the first response signal and the second response signal are signals of the Discovery and Basic Configuration Protocol (DCP protocol) in accordance with a second layer of an Open Systems Interconnection (OSI) model.

* * * * *